(12) United States Patent
Seeley (10) Patent No.: US 6,623,394 B2
(45) Date of Patent: Sep. 23, 2003

(54) EDDY CURRENT ACTIVATION OF A LIMITED SLIP DIFFERENTIAL SYSTEM

(75) Inventor: Stan L. Seeley, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 12 days.

(21) Appl. No.: 10/040,859

(22) Filed: Dec. 28, 2001

(65) Prior Publication Data

US 2003/0125151 A1 Jul. 3, 2003

(51) Int. Cl.[7] .................. F16H 48/30; F16D 19/00; F16D 27/00; F16D 37/62
(52) U.S. Cl. .................. 475/150; 475/153; 192/35; 192/84.2
(58) Field of Search ................. 475/150, 153, 475/154, 231; 192/35, 48.2, 48.7, 84.2, 84.1

(56) References Cited

U.S. PATENT DOCUMENTS

| | | | |
|---|---|---|---|
| 4,128,147 A | 12/1978 | Lafuente Ruberte et al. | |
| 4,838,118 A | 6/1989 | Binkley | |
| 5,007,886 A | 4/1991 | Holmquist et al. | 472/231 |
| 5,019,021 A | 5/1991 | Janson | 475/150 |
| 5,092,825 A | 3/1992 | Goscenski, Jr. et al. | 475/150 |
| 5,322,484 A * | 6/1994 | Reuter | 475/150 |
| 5,651,437 A * | 7/1997 | Organek et al. | 192/35 |
| 5,713,445 A * | 2/1998 | Davis et al. | 192/35 |
| 5,819,883 A * | 10/1998 | Organek et al. | 188/71.5 |
| 5,911,643 A | 6/1999 | Godlew et al. | 475/150 |
| 5,915,513 A | 6/1999 | Isley, Jr. et al. | 192/35 |
| 5,954,150 A * | 9/1999 | Miller et al. | 180/248 |
| 6,349,809 B1 * | 2/2002 | Isley, Jr. | 192/35 |

OTHER PUBLICATIONS

U.S. publication 2001/0041637 to Robert Leeper filed May 2001.*
TRW Rotary Solenoids Document (7 Pages).

* cited by examiner

*Primary Examiner*—Sherry Estremsky
*Assistant Examiner*—Tisha D. Lewis
(74) *Attorney, Agent, or Firm*—Brinks Hofer Gilson & Lione (57) ABSTRACT

A limited slip differential system is disclosed where one or more eddy currents activate a ball-ramp actuator for engaging a clutch assembly to a differential case. The eddy currents create a braking torque in the ball-ramp actuator.

9 Claims, 9 Drawing Sheets

EDDY CURRENT ACTIVATION OF A LIMITED SLIP DIFFERENTIAL SYSTEM

FIELD OF THE INVENTION

This invention relates generally to limited slip differentials. More particularly, this invention relates to limited slip differentials having a retarding differential action mechanism that may be activated by an external signal.

BACKGROUND OF THE INVENTION

Vehicles use a differential to drive axles of parallel wheels at essentially the same time. Vehicles include automobiles, trucks, and the like. The differential permits the wheels to rotate at different speeds, such as when the vehicle makes a turn. The differential permits the outer wheel to turn faster than the inner wheel during the turn. A limited slip differential usually is used to divert more driving force to a wheel with traction when the other wheel begins to slip. A limited slip differential typically has a clutch mechanism to limit or retard the differential action between the wheels and transfer more of the available torque to the wheel with traction. A limited slip differential usually has a gear case enclosing a differential gear set, which has a pair of pinion gears and a pair of side gears. A clutch typically is positioned between one of the side gears and the gear case. When engaged, the clutch retards the relative rotation between the gear case and the side gear. Other limited slip differentials may have other arrangements and configurations of the clutch with the gear set.

Many limited slip differentials have an actuating mechanism to engage and disengage the clutch. In some limited slip differentials, the clutch is actuated in response to the sensation of a predetermined speed differential between the side gears. In other limited slip differentials, the clutch is actuated in response to an external input signal. The actuating mechanism in many limited slip differentials is a ball-ramp actuator positioned outside or within the wall of the gear case.

A ball-ramp actuator usually has an internal actuating plate disposed within the differential housing and an external actuating plate disposed outside to the differential housing. Each of the actuating plates has corresponding raceways for holding cam balls between the actuating plates. The raceways are bi-directional, forming a curve and an incline in an axial direction. As the cam balls roll in the raceways, the linear axial direction of the cam balls changes in response to the incline. Upon activation, a solenoid or other electromagnetic device attracts and frictionally engages a friction material on the external actuation plate. The frictional engagement of the external actuating plate retards the rotation of the internal actuating plate, thus rotating the cam balls in the raceways and "up" the incline and causing the clutch to engage. When deactivated, the solenoid or other electromagnetic device disengages from the external actuating plate. The cam balls rotate in the raceways and "down" the incline, causing the clutch to disengage.

The friction material on the external actuating plate can wear-out prematurely. The friction materials also may change friction characteristics due to heat and misalignments. The friction material may have higher costs from special materials and construction. The frictional material may have a relatively smaller engagement area with the solenoid or other electromagnetic device. A smaller engagement area would require a higher engagement force to activate the ball-ramp actuator.

SUMMARY

This invention provides a limited slip differential system where an eddy current activates a retarding differential mechanism such as a ball-ramp actuator and a clutch assembly.

In one aspect, a limited slip differential system has a clutch assembly, a ball-ramp actuator, a rotor, and a coil assembly. The ball-ramp actuator is connected to the clutch assembly. The rotor is connected to the ball-ramp actuator. The coil assembly is disposed adjacent to the rotor. The coil assembly and the rotor form a gap. The coil assembly is operable to generate one or more eddy currents in the rotor. The eddy currents are operable to create a braking torque in the ball ramp actuator.

In a further aspect, a limited slip differential system includes a clutch assembly, a ball-ramp actuator, a rotor, a coil assembly, and an electric control unit. The ball-ramp actuator is connected to the clutch assembly. The rotor is connected to the ball-ramp actuator. The coil assembly is disposed adjacent to the rotor. The coil assembly and the rotor form a gap. The electric control unit is connected to the coil assembly. The coil assembly is operable to generate one or more eddy currents in response to an electric power signal from the electric control unit. The eddy currents are operable to create a braking torque in the ball ramp actuator. The electric control unit is operable to actively monitor an electromotive force from the coil assembly.

A further aspect provides a method for activating a limited slip differential having a ball-ramp actuator an d a clutch assembly in a differential case. In this method, one or more eddy currents are induced in the ball-ramp actuator. A braking torque is generated in the ball-ramp actuator in response to the eddy cur rents. The clutch engages the differential case in response to the braking torque.

Other systems, methods, features, and advantages of the invention will be or will become apparent to one skilled in the art upon examination of the following figures and detailed description. All such additional systems, methods, features, and advantages are intended to be included within this description, within the scope of the invention, and protected by the accompanying claims.

BRIEF DESCRIPTION OF THE FIGURES

The invention may be better understood with reference to the following figures and detailed description. The components in the figures are not necessarily to scale, emphasis being placed upon illustrating the principles of the invention. Moreover, like reference numerals in the figures designate corresponding parts throughout the different views.

FIGS. 6A and 6B represent views of a rotor and a coil in a limited slip differential system with eddy current activation; where

DETAILED DESCRIPTION OF THE PREFERRED EMBODIMENT

Figure 1:
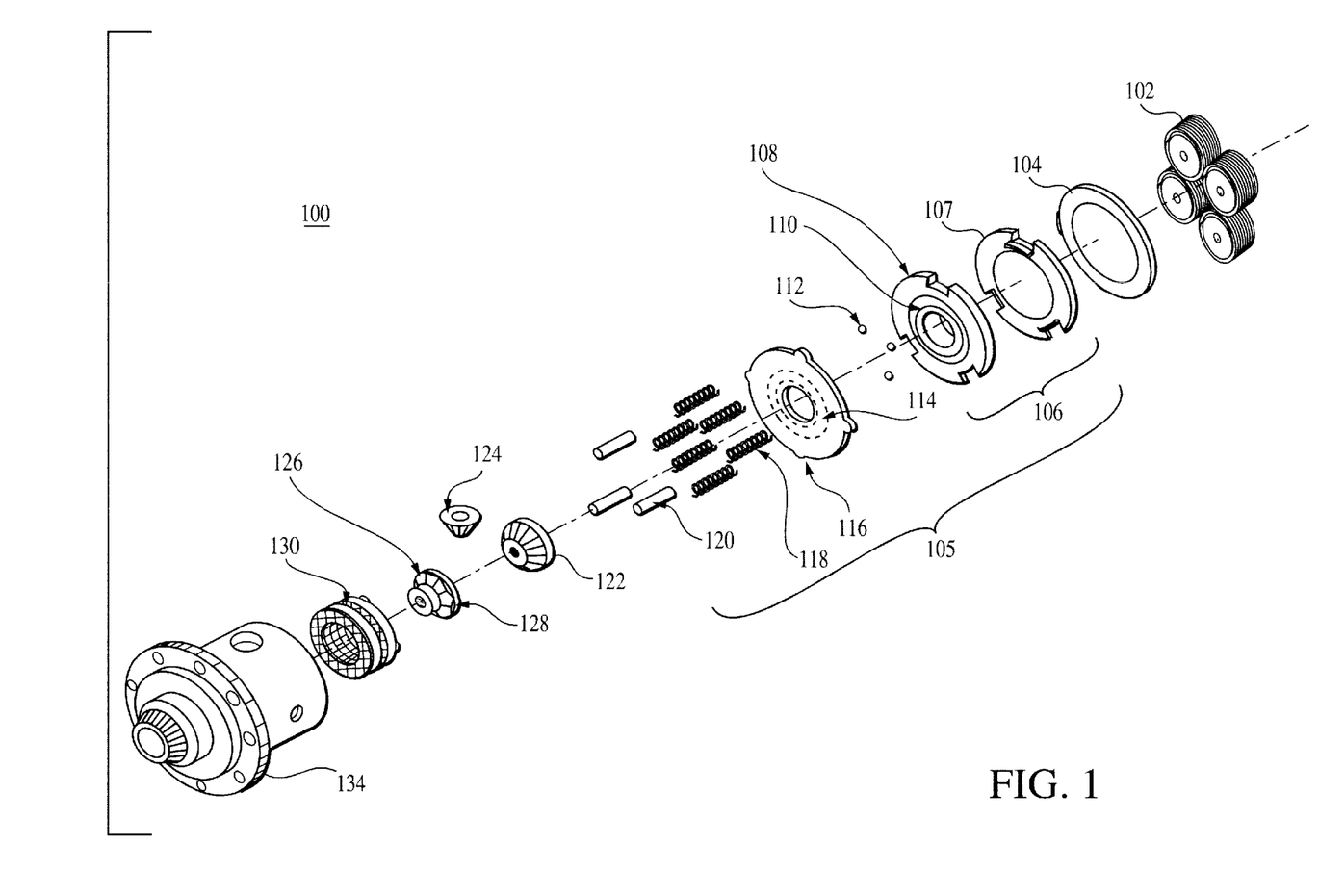
FIGS. 1 represents an unassembled perspective view of a limited slip differential system with eddy current activation according to an embodiment.
Figure 2:
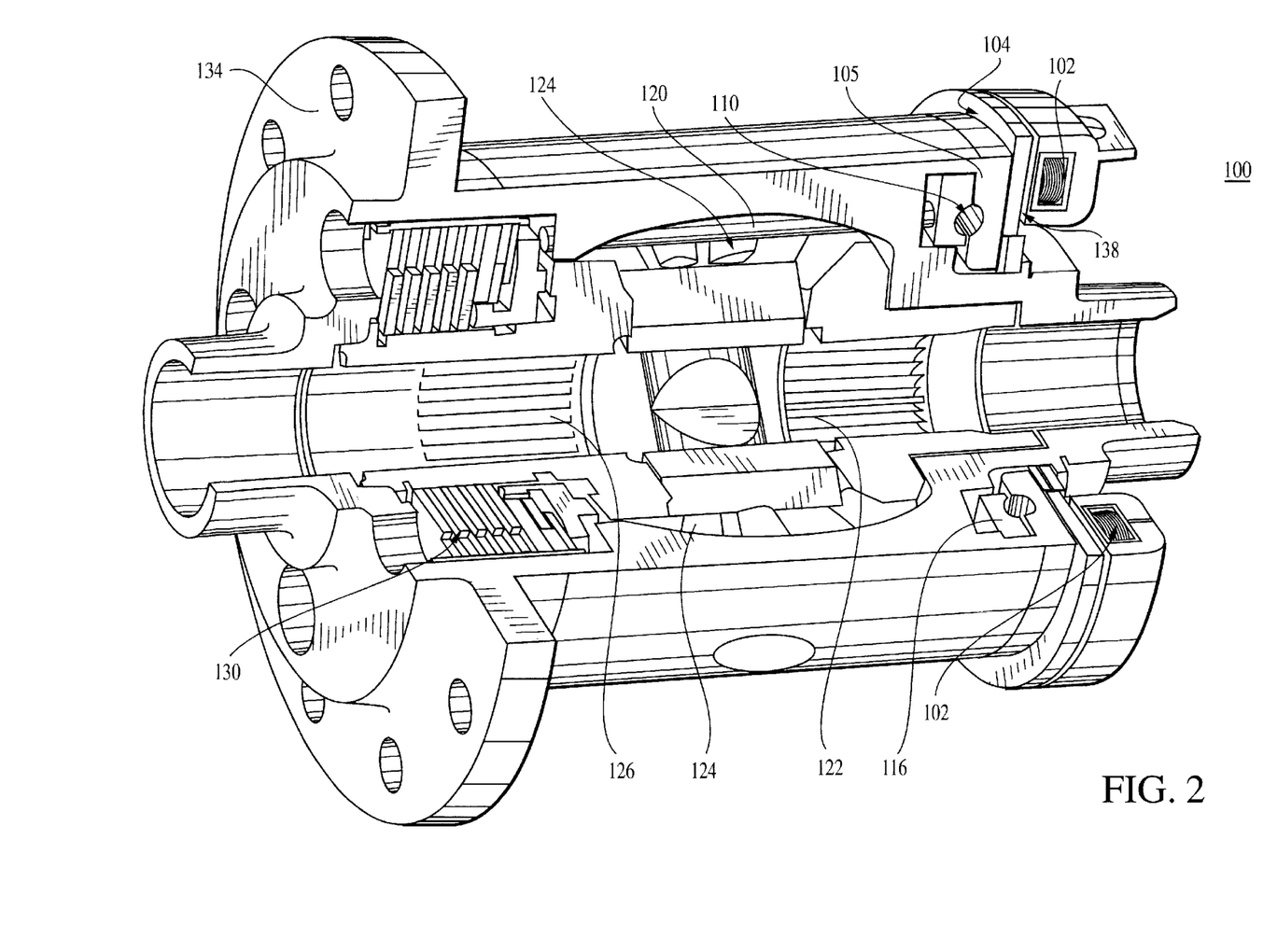
FIG. 2 represent s a cutaway, perspective view of the limited slip differential system with eddy current activation shown in FIG. 1.

FIGS. 1 and 2 represent views of a limited slip differential system 100 with eddy current activation according to an embodiment. FIG. 1 represents an unassembled perspective view of the limited slip differential system 100. FIG. 2 represents a cutaway, perspective view of the limited slip differential system 100. A limited slip differential system may have other configurations and arrangements including those with fewer or additional parts.

The limited slip differential system 100 has a coil assembly 102 disposed adjacent to a rotor 104. The coil assembly 102 and rotor 104 form a gap or space 138 therebetween. The coil assembly 102 comprises multiple coils. In one aspect, the coils are essentially the same size and are positioned essentially equidistant to each other around the rotor 104. In another aspect, the coils are about two inches in height and diameter. The coil assembly 102 may have other configurations including those with fewer and additional coils.

The rotor 104 is connected to an external actuation plate 106 of a ball-ramp actuator 105. The external actuation plate 106 has an outside section 107 and an inside section 108. The rotor 104 is connected the outside section 107. In one aspect, the rotor 104 and outside section 107 are separate components. In another aspect, the rotor 104 and outside section 107 comprise one component, in which case the rotor 104 is part of the ball-ramp actuator 105. The inside section 108 has one or more raceways 110 that are ramped bi-directionally. One or more cam balls are disposed in the one or more raceways 110. The cam balls 112 also are disposed in one or more ramps 114 on an internal actuation plate 116. The raceways 110 and the ramps 114 are bi-directional, following the curves of the respective actuation plates 106 and 116 and inclining in an axial direction. In one aspect, there are three cam balls 112, each disposed in a corresponding raceway 110 and a corresponding ramp 114. There may be additional or fewer raceways 110, cam balls 112, and ramps 114, which may have other configurations.

The ball-ramp actuator 105 also has one or more springs 118 and one or more pins 120. The springs 118 separate and connect the internal actuation plate 116 to a differential case 134. The pins 120 separate and connect the internal actuation plate 116 to a clutch assembly 130. The differential case 134 encloses side gears 122 and 126 and pinion gears 124.

In operation, electric power is applied to the coil assembly 102 to produce a magnetic field. The power may be applied to the coils in the coil assembly 102 in parallel or in series. The magnetic field extends across the gap or space 138, creating a magnetic potential in the rotor 104. The magnetic potential creates one or more eddy currents within the rotor 104. The eddy currents dynamically oppose the magnetic field to create a braking torque on the external actuation plate 106. The magnitude of the braking torque is responsive to several variables such as the number of coils, the number of turns per coil, the applied current, the physical dimensions of the gap 138 and rotor 104, and material types. The braking torque is induced by the eddy currents and slows the rotor 104, which also slows the external actuation plate 106. The cam balls 112 roll along the raceways 110 and ramps 114, moving the internal actuation plate 116 in a linear direction, which causes the clutch 130 to engage. When electric power is removed from the coil assembly 102, the eddy currents disappear and the clutch 130 disengages.

Figure 3:
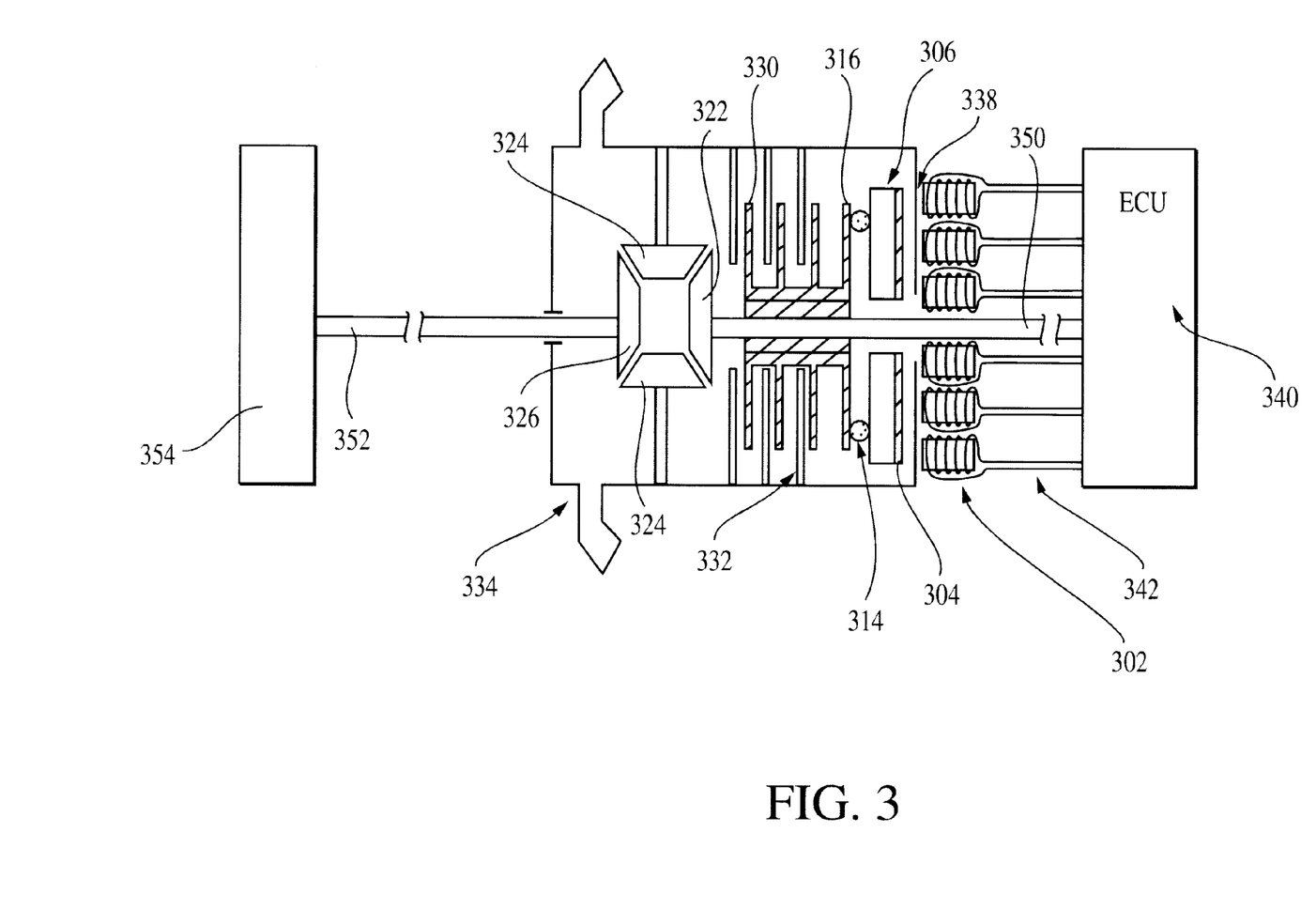
FIG. 3 represent s a side view of a limited slip differential system with eddy current activation according to another embodiment.

FIG. 3 represents a side view of a limited slip differential system 300 with eddy current activation according to another embodiment. The limited slip differential system 300 has a coil assembly 302 comprising one or more coils 342 connected to an electric control unit (ECU) 340. The coil assembly 302 is operatively disposed adjacent to a rotor 304 connected to an external actuation plate 306. The coil assembly 302 and rotor 304 form a gap or space 338 therebetween. Operatively disposed includes the electrical and magnetic connections along with the spatial positioning for the coil assembly 302 to induce a magnetic field in the rotor 304 when the coil assembly 302 is activated.

The external actuation plate 306 has one or more raceways (not shown), in which one or more cam balls 314 are disposed. The cam balls 314 also are disposed in one or more corresponding ramps (not shown) on an internal actuation plate 316. The external and internal actuation plates 306 and 316 and the cam balls 314 comprise a ball-ramp actuator. The internal actuation plate 316 is connected to a clutch assembly 330.

The limited slip differential system 300 also has a differential case 334, which defines one or more tab portions 332. Pinion gears 324 are connected to a first side gear 322 and a second side gear 326. The first side gear 322 connects to a first axle 350, which extends to connect to a first wheel (not shown). The second side gear 326 connects to a second axle 352, which extends to connect to a second wheel 354.

In operation, the ECU 340 supplies an electric power signal to the coil assembly 302, which generates a magnetic field with the rotor 304. The magnetic field creates eddy currents that retard or reduce the rotation of the rotor 304. The reduction in rotation of the rotor activates the ball-ramp actuator, causing the clutch assembly 330 to engage the tab portions 332 of the differential case 334. When the ECU 340 stops supplying electric power to the coil assembly 302, the eddy currents end and the rotor rotation is no longer reduced. The ball-ramp actuator deactivates causing the clutch assembly 330 to disengage from the tab portions 332.

Figure 4:
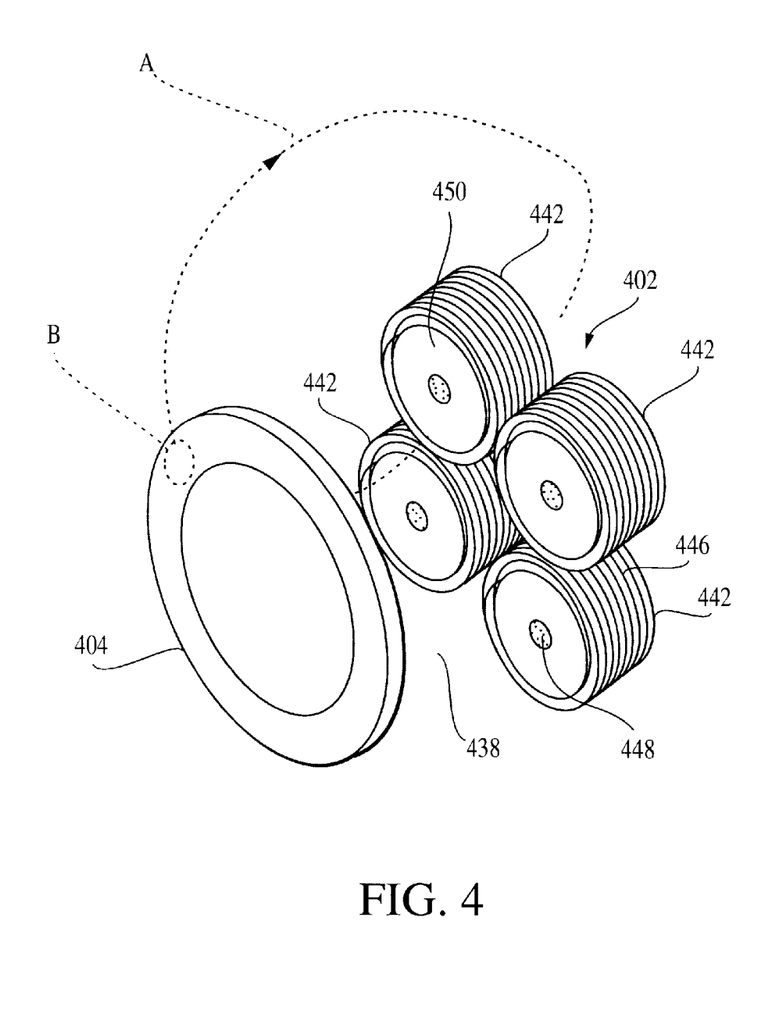
FIG. 4 represents an expanded, close-up view of a coil assembly and a rotor for a limited slip differential system with eddy current activation according to one embodiment.

FIG. 4 represents an expanded, close-up view of a coil assembly 402 and a rotor 404 for a limited slip differential system with eddy current activation according to one embodiment. The coil assembly 402 and rotor 404 have a gap or space 438 therebetween. In one aspect, the gap is reduced to increase the magnetic properties between the coil assembly 402 and the rotor 404. In another aspect, the gap is expanded to reduce the potential contact of the coil assembly 402 with the rotor 404. In a further, aspect, the coil assembly 402 is placed at an optimal distance from the rotor 404. The optimal distance is where the coil assembly 402 can create the magnetic properties with the rotor 404 to form the desired eddy currents and where the coil assembly 402 will not contact the rotor 404. In an additional aspect, the optimal distance is about 0.25 inches.

The coil assembly 402 has one or more coils 442 arranged circumferentially along the rotor 404. The number of coils 442 is responsive to the physical dimensions of the rotor 404 and the magnetic properties needed to generate a braking torque for activating the ball-ramp actuator. Each coil 442 has a wire winding 446 wrapped around a core 448. The wire winding comprises copper or a like material. The core comprises steel, iron, or a like material. The coils 442 are statically mounted on the coil assembly 402, where a pole face 450 confronts the rotor 404 across the gap 438. The coils 442 may have other configurations and may have other arrangements in the coil assembly 402.

When the coils 442 are energized by an electric current, each coil 442 makes a composite magnetic field A with the rotor 404. The composite magnetic field A forms or creates eddy currents B in the rotor 404. In one aspect, each coil 442 forms multiple eddy currents in the rotor 404 while the rotor 404 is rotating in relation to the coil assembly 402. The eddy currents create a braking torque that retards or reduces the rotation of the rotor 404. The braking torque is a torsional force opposite to the rotation direction of the rotor 404. The braking torque is a sufficient force to activate the ball ramp actuator. In one aspect, the braking torque is at least about 15 N-m (Newton-meters). The braking torque may be greater or lesser force.

Figure 5:
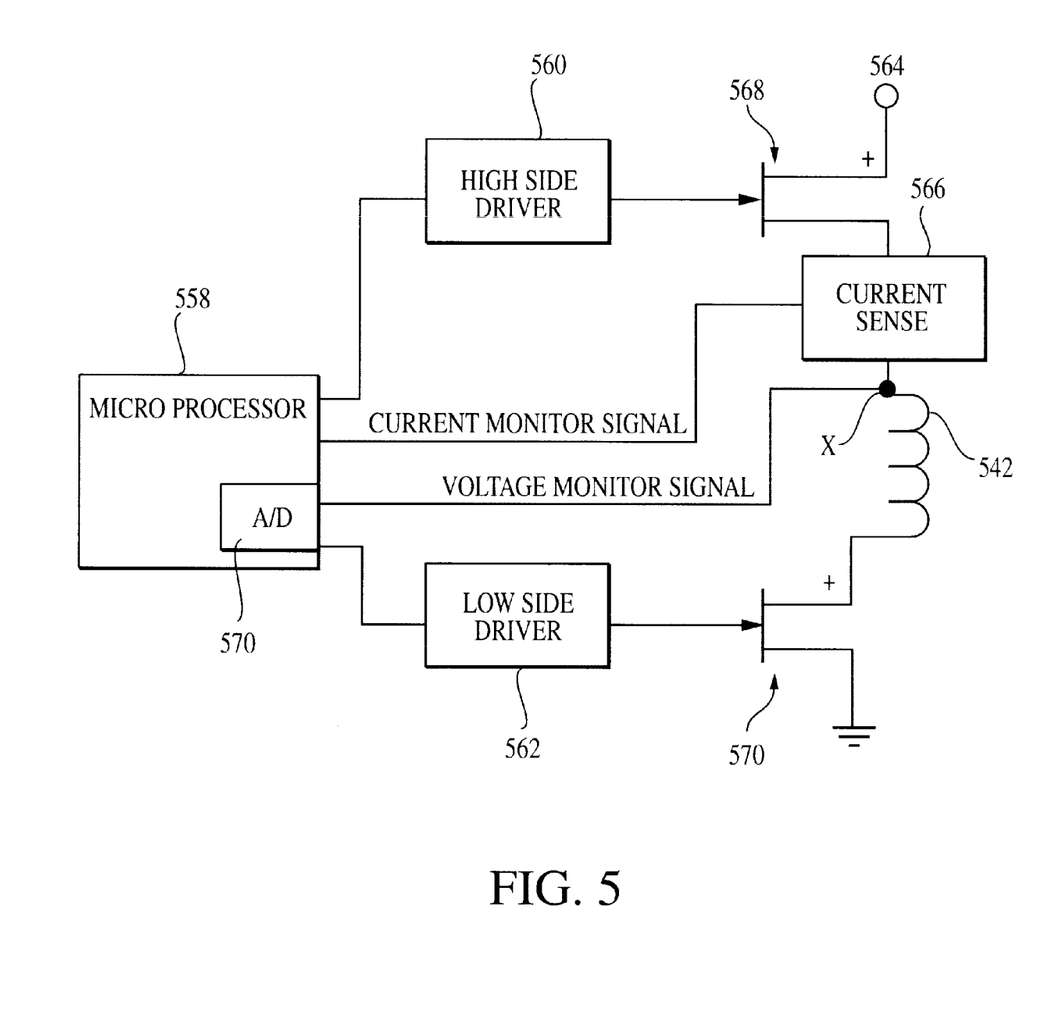
FIG. 5 represents a block schematic diagram of an electric control unit (ECU) for a limited slip differential system with eddy current activation according to an embodiment.

FIG. 5 represents a block schematic diagram of an electric control unit (ECU) 540 for a limited slip differential system with eddy current activation according to an embodiment. The ECU 540 has a microprocessor 58 connected to a high side driver 560 and a low side driver 562. The microprocessor 558 has an analog to digital converter 570. The high side driver 560 is connected through a high side transistor 568 to a coil 542. The high side transistor 568 also is connected to a battery 564 or other power supply. The low side driver 562 is connected through a low side transistor 570 to the coil 542. The low side transistor 570 also is connected to ground. The microprocessor 558 uses the high and low side drivers 560 and 562 along with the higher low side transistors 568 and 570 to control the current through the coil 542, which in turn controls the magnetic field creating the eddy currents.

The ECU 540 also has a current sensor 566 disposed around or near the connection between the high side transistor 568 and the coil 542. The current sensor 566 provides a current monitor signal to the microprocessor 558. The microprocessor 558 also is connected to a test point X, where a voltage monitor signal is provided to the microprocessor 558. The voltage monitor signal represents the inherent back EMF (electromotive force) of the eddy current actuator system. The EMF correlates to the braking torque created by the eddy currents. The microprocessor 558 actively monitors the voltage monitor signal or EMF and adjusts the current to the coil 542 in response to the voltage monitor signal. Actively monitor includes essentially continuous monitoring, incremental monitoring, triggered monitoring, or sampling of the voltage monitor signal. While configured for one coil, the ECU 540 may be similarly configured for other and all the coils in the coil assembly. The ECU 540 may have other arrangements and configurations including those with fewer and additional components.

Figures 6A, 6B:
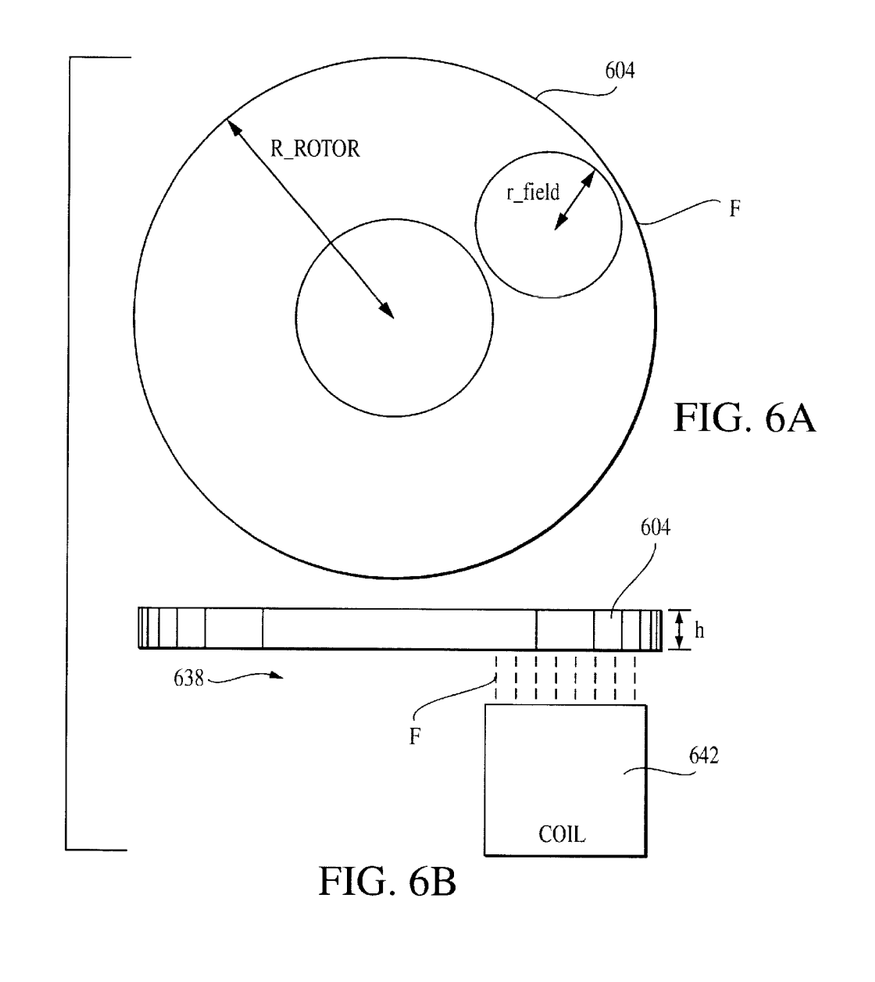
FIG. 6A is a bottom view of the rotor; and where
FIG. 6B is a side view of the rotor and coil.

FIGS. 6A and 6B represent views of a rotor 604 and a coil 642 in a limited slip differential system with eddy current activation. FIG. 6A is a bottom view of the rotor 604. FIG. 6B is a side view of the rotor 604 and coil 642. The rotor 604 and the coil 642 form a space or gap 638 therebetween. When activated by an electric current, the coil 642 creates an applied magnetic field F with the rotor 604. The applied magnetic field F has a field radius r_field on the rotor 604 and a field strength B. The rotor 604 has a depth h, a rotor radius R_rotor, and a conductivity σ_rotor.

In an eddy current actuator system, N is the number of coils that can fit around the rotor. The maximum number of coils $N_{max}$ that can physically fit circumferentially around the rotor is represented by the following equation:

$$N_{max} = \frac{(2 \cdot \pi \cdot R\_rotor)}{2 \cdot r\_field},$$

which reduces to the following equation:

$$N = \pi \cdot \frac{R\_rotor}{r\_field}.$$

The braking torque M of an eddy current actuator system is represented by the $$M = -N \cdot \sigma\_rotor \cdot h\left(\frac{V}{2 \cdot \pi}\right) \cdot B^2 \cdot \left[\frac{(\pi \cdot r\_field^2)}{2}\right] \cdot R\_rotor^2,$$

where V is the angular velocity of the rotor 604.

Figure 7:
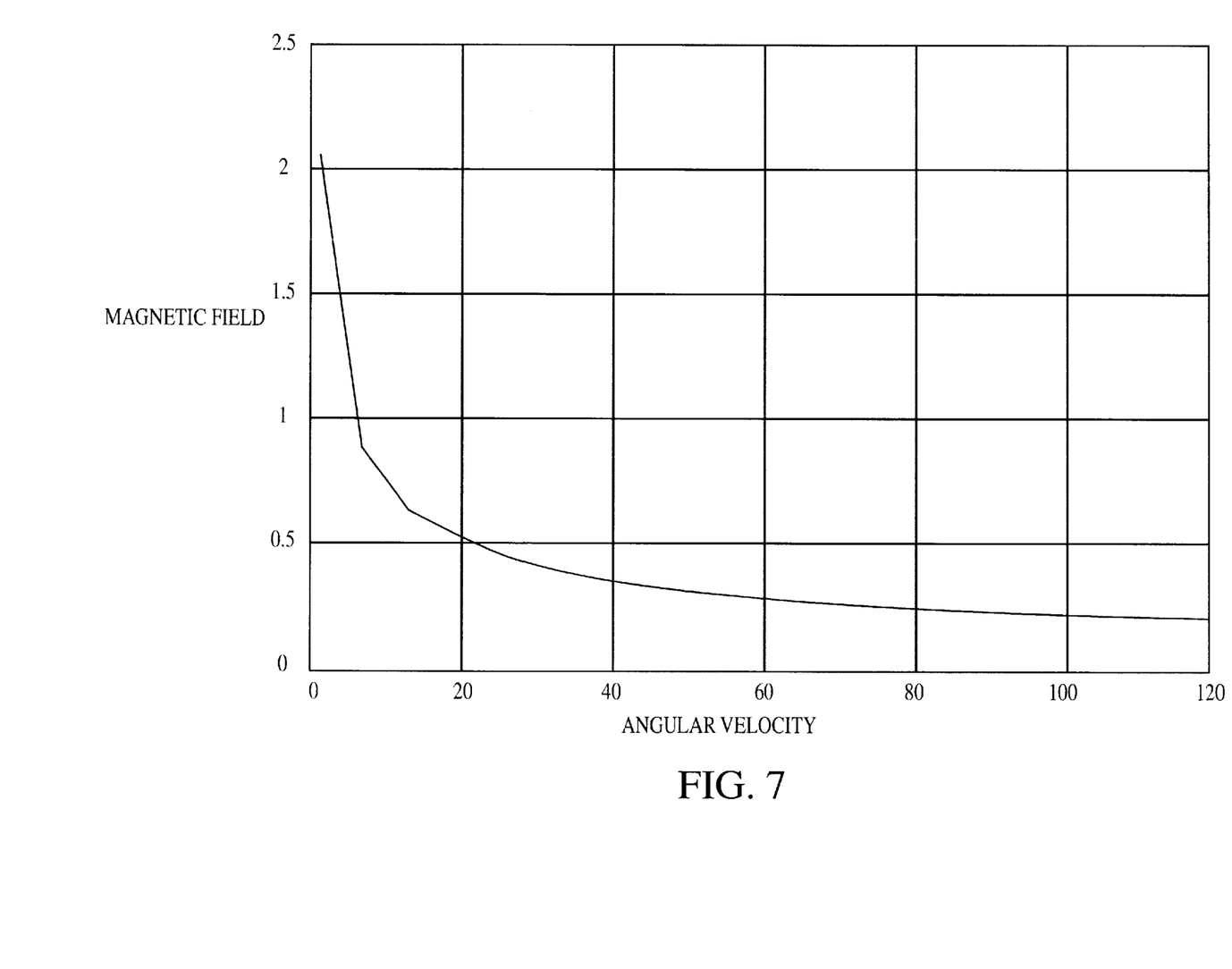
FIG. 7 is a chart representing the relationship between the magnetic field and the angular velocity in a limited slip differential with eddy current activation according to an embodiment.

The magnetic field B required to activate the ball-ramp actuator in an eddy current actuator system is dependent upon the angular velocity of the rotor 604. The braking torque M equation may be solved to determine the field strength B of the magnetic field for various angular velocities of this rotor 604. FIG. 7 is a chart representing the relationship between the magnetic field and the angular velocity in a limited slip differential with eddy current activation according to an embodiment. There may be other correlations between the field strength and the angular velocity.

Figure 8:
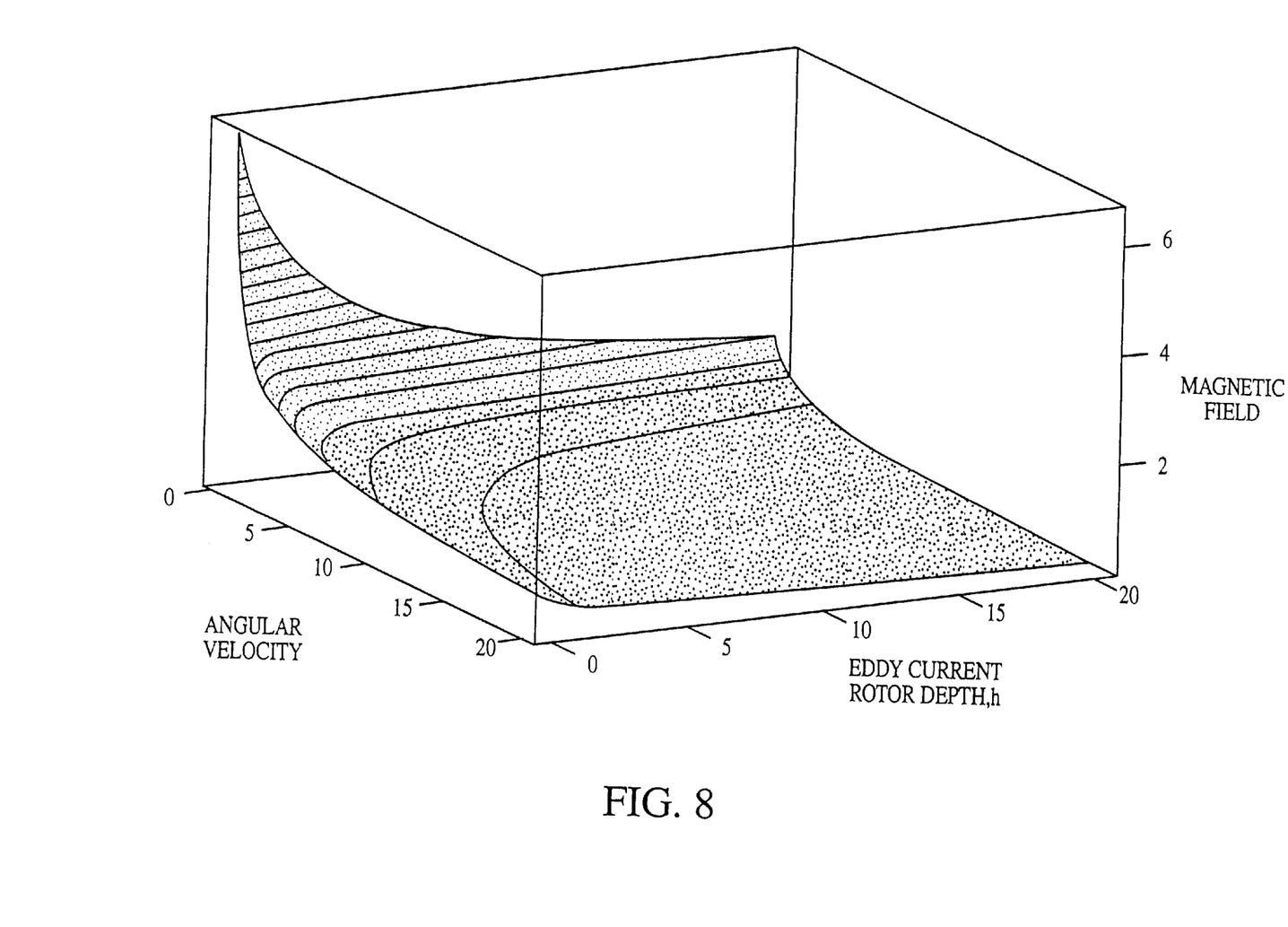
FIG. 8 is a chart representing the relationship between the angular velocity, the rotor depth, and the magnetic field in a limited slip differential with eddy current activation according to one embodiment.

In addition, the rotor depth determines the minimum magnetic field as speed increases. A time-varying field also reduces the dimension and minimum speed requirements. FIG. 8 is a chart representing the relationship between the angular velocity, the rotor depth, and the magnetic field in a limited slip differential with eddy current activation according to one embodiment. There may be other correlations between the angular velocity, rotor depth, and magnetic field.

Figure 9:
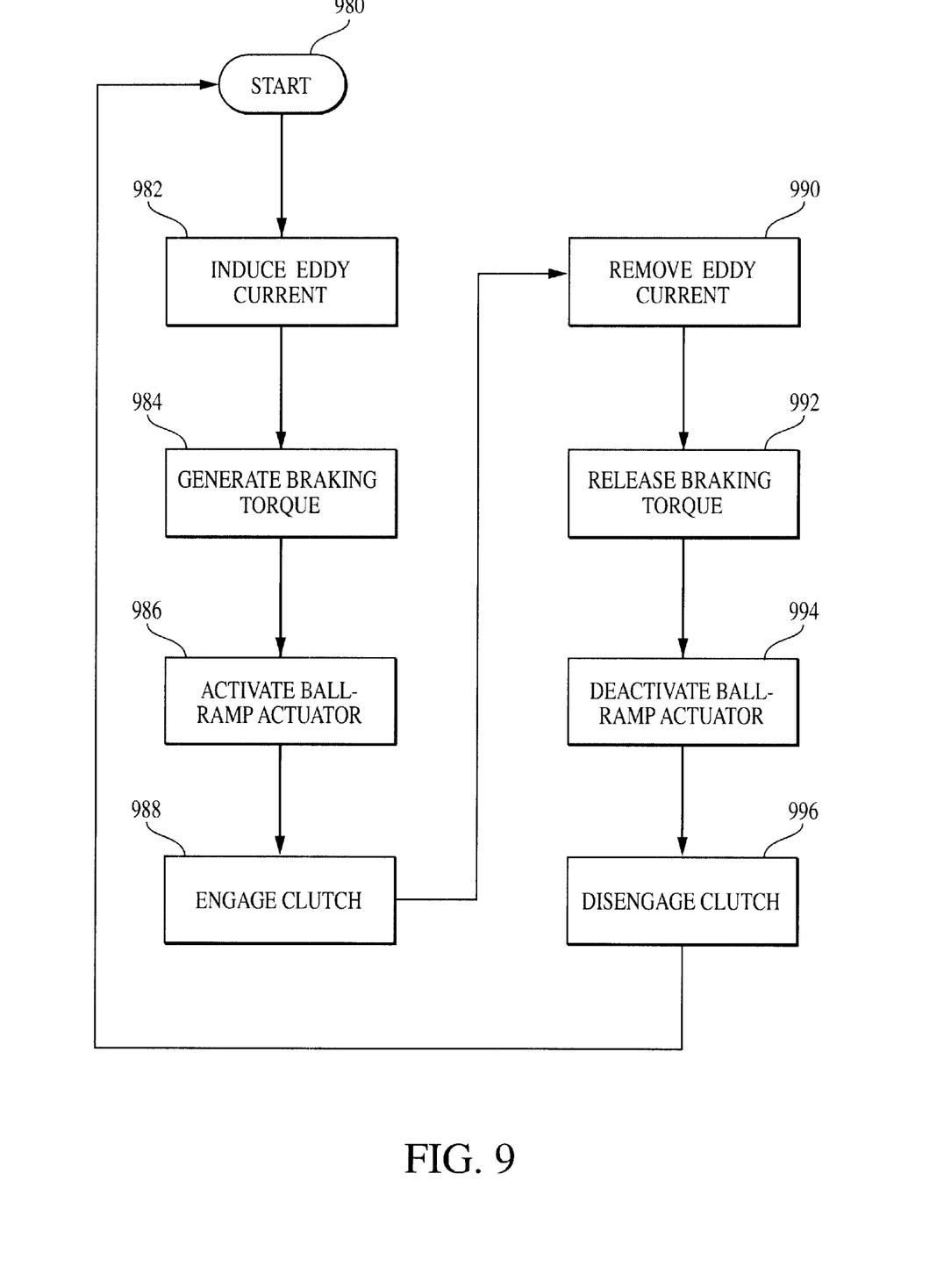
FIG. 9 is a flowchart representing a method for activating a limited slip differential with an eddy current according one embodiment.

FIG. 9 is a flowchart representing a method for activating a limited slip differential with an eddy current according one embodiment. At start 980, the limited slip differential is operating or about to operate. In one aspect, the limited slip differential is part of the drive train for an automobile. In another aspect, the limited slip differential is part of another vehicle. An eddy current is induced 982 in a rotor or a ball-ramp actuator as previously discussed. The eddy current generates 984 a braking torque in the ball-ramp actuator. The braking torque activates 986 the ball-ramp actuator, which causes the clutch to engage 988 the differential case as previously discussed. The eddy current is removed 990, thus releasing 992 the torque braking. Without the torque braking, the ball-ramp actuator deactivates 994, which causes the clutch to disengage 996 the differential case.

Various embodiments of the invention have been described and illustrated. However, the description and illustrations are by way of example only. Other embodiments and implementations are possible within the scope of this invention and will be apparent to those of ordinary skill in the art. Therefore, the invention is not limited to the specific details, representative embodiments, and illustrated examples in this description. Accordingly, the invention is not to be restricted except in light as necessitated by the accompanying claims and their equivalents.

What is claimed is:

1. A limited slip differential system comprising:

a clutch assemble;

a ball-ramp actuator connected to the clutch assembly;

a rotor connected to the ball-ramp actuator;

a coil assembly disposed adjacent to the rotor, the coil assembly and the rotor forming a gap therebetween; and an electric control unit connected to the coil assembly, where the electric control unit comprises:

a microprocessor;

a high side driver connected to at least one coil in the coil assembly; and a low side driver connected to the at least one coil;

where the coil assembly is operable to generate at least one eddy current in response to an electric power signal from the electric control unit, where the at least one eddy current is operable to create a braking torque in the ball ramp actuator, where the electric control unit is operable to actively monitor an electromotive force from the coil assembly, and where the microprocessor receives a voltage monitor signal from a test point between the high side driver and the at least one coil, the voltage monitor signal responsive to the back electromotive force.

2. The limited slip differential system according to claim 1, where the ball-ramp actuator comprises:

an external actuation plate forming at least one raceway, the external actuation plate connected to the rotor;

at least one cam ball disposed in the at least one raceway; and an internal actuation plate forming at least one ramp, where the at least one cam ball is disposed in the ramp, where the internal actuation plate is connected to the clutch assembly, where the at least one eddy current creates a braking torque in the external actuation plate.

3. The limited slip differential system according to claim 1, where the at least one coil has a winding wire wrapped around a core, the at least one coil defining a pole face, where the pole face confronts the rotor.

4. The limited slip differential system according to claim 1, where the coil assembly is disposed at an optimal distance from the rotor.

5. The limited slip differential system according to claim 4, where the optimal distance is about 0.25 inches.

6. The limited slip differential system according to claim 1, where the braking torque is at least about 15 Newton-meters.

7. The limited slip differential system according to claim 1, where the braking torque activates the ball-ramp actuator.

8. The limited slip differential system according to claim 1, where the clutch assembly engages a differential case in response to the braking torque.

9. The limited slip differential system according to claim 1, where the electric control unit adjusts the eddy current in response to the electromotive force.

* * * * *

UNITED STATES PATENT AND TRADEMARK OFFICE
CERTIFICATE OF CORRECTION

PATENT NO. : 6,623,394 B2                                              Page 1 of 1
DATED      : September 23, 2003
INVENTOR(S): Stan L. Seely It is certified that error appears in the above-identified patent and that said Letters Patent is hereby corrected as shown below:

<u>Title page,</u>
Item [12], delete "Seeley" and substitute -- Seely -- in its place.
Item [75], Inventor, delete "Seeley" and substitute -- Seely -- in its place.

Signed and Sealed this

Third Day of February, 2004

JON W. DUDAS
*Acting Director of the United States Patent and Trademark Office*